United States Patent [19]

Nagano

[11] Patent Number: 4,573,949

[45] Date of Patent: Mar. 4, 1986

[54] DERAILLEUR FOR A BICYCLE

[75] Inventor: Masashi Nagano, Izumi, Japan

[73] Assignee: Shimano Industrial Company Limited, Osaka, Japan

[21] Appl. No.: 551,585

[22] Filed: Nov. 14, 1983

[30] Foreign Application Priority Data

Nov. 17, 1982 [JP] Japan .................................. 57-202657
Jan. 19, 1983 [JP] Japan .................................... 58-7649

[51] Int. Cl.$^4$ ............................................. F16H 9/00
[52] U.S. Cl. .................................................... 474/80
[58] Field of Search ................................... 474/80, 82

[56] References Cited

U.S. PATENT DOCUMENTS 4,348,198  9/1982  Shimano .......................... 474/80 X
4,416,646 11/1983  Bergles ................................. 474/80
4,469,479  9/1984  Ozaki .................................... 474/80

*Primary Examiner*—James A. Leppink
*Assistant Examiner*—Frank McKenzie
*Attorney, Agent, or Firm*—Stevens, Davis, Miller & Mosher

[57]  ABSTRACT

A derailleur for a bicycle is disclosed which is so constructed that a first support is attached swingably through a first pivot shaft to a movable member which moves axially relative to a multistage sprocket assembly of the bicycle with respect to a base member and a second support is supported swingably to the first support through a second pivot shaft. A guide pulley is supported rotatably to the free end of the first support, and a tension pulley is supported rotatably to the free end of the second support. A rotary member is provided around the first pivot shaft, and a tension spring is interposed between the rotary member and the movable member. The tension spring rotates the rotary member in the direction of applying tension to a driving chain. An interlocking mechanism is interposed between the second support and the rotary member which allows an elastic force of the spring to act on the second support.

6 Claims, 13 Drawing Figures

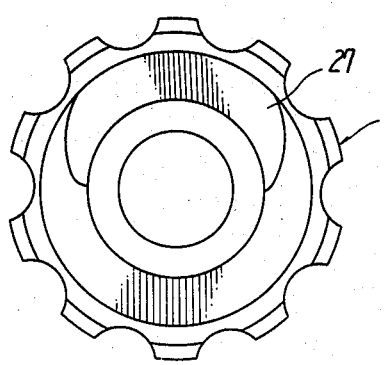
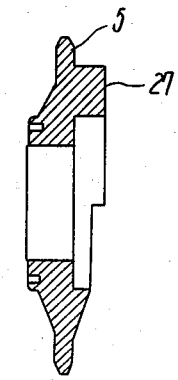
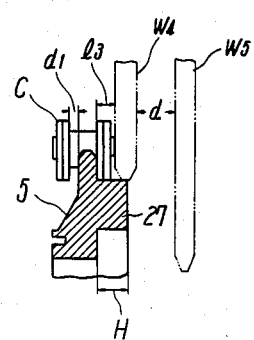
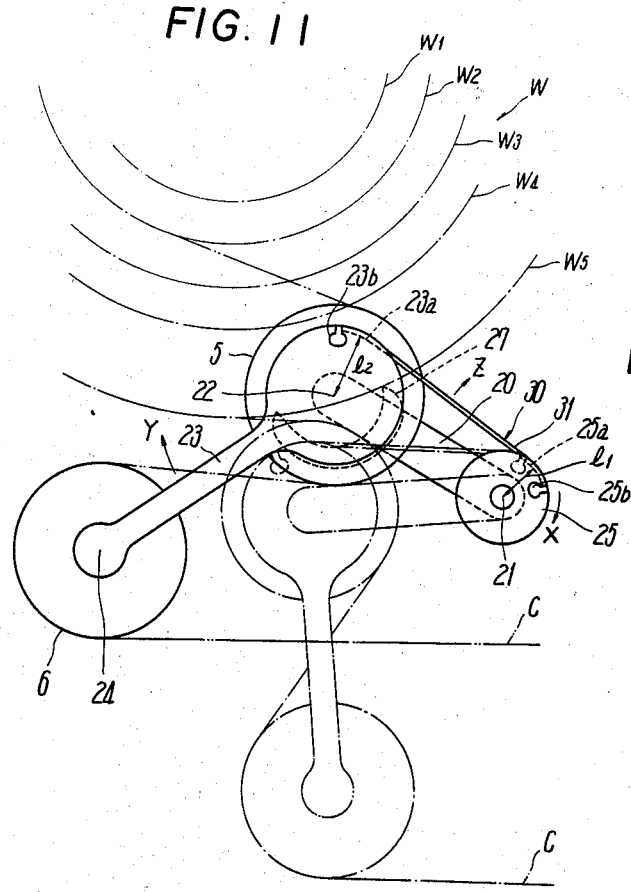
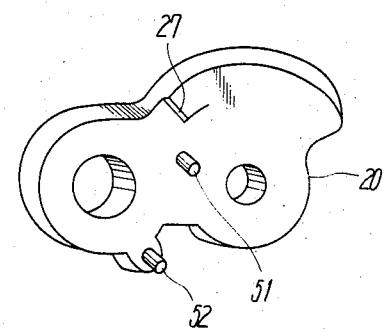
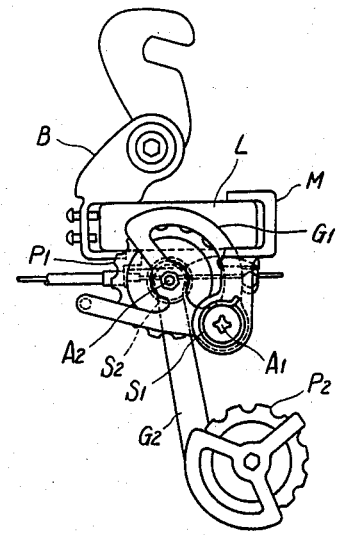

DERAILLEUR FOR A BICYCLE

FIELD OF THE INVENTION

This invention relates to a derailleur for a bicycle, and more particularly to a derailleur for a bicycle, which is adapted to switch a driving chain from one sprocket to another sprocket on a multi-stage sprocket assembly mounted to a rear wheel of the bicycle to thereby change the bicycle speed.

BACKGROUND ART

Conventionally, a bicycle derailleur, as disclosed in, for example, Japanese Patent Publication Gazette No. Sho. 55-10,428, switches the driving chain exactly and quickly to the sprocket regardless of a difference between the number of teeth of the respective sprockets of the multistage sprocket assembly.

This conventional derailleur, as shown in FIG. 13, is so constructed that a movable member M is supported movably to a base member B through a pair of parallelogrammic link members L, and a guide pulley $P_1$ is supported swingably to the movable member M around a horizontal support shaft $A_1$ through a first support $G_1$. The first support $G_1$ is subjected to an elastic force acting clockwise through a first spring $S_1$, a tension pulley $P_2$ is supported rotatably to a second support $G_2$ swingable around a shaft $A_2$ for the guide pulley $P_1$, and the second support $G_2$ is subjected to an elastic force acting clockwise through a second spring $S_2$.

The conventional example, however, uses the first and second springs $S_1$ and $S_2$ so that they need be balanced with accuracy, in order to carry out the most ideal chain switching while considering the difference between sprocket teeth numbers. Also, the springs $S_1$ and $S_2$, even when balanced with accuracy, cause variation in the elastic force due to machining and by fatigue after use. As a result, a problem has been created in that an interval between the guide pulley and the respective sprockets cannot be kept exactly constant.

Moreover, the use of first and second springs $S_1$ and $S_2$ increases the number of parts, deteriorates the workability, and leads to a high manufacturing cost as a whole.

In other words, in a case where the conventional derailleur switches the driving chain from a smaller diameter sprocket to a larger diameter one, the movable members M move in a parallelogrammic manner with respect to the base member B to push the chain carried by the guide pulley $P_1$ against the side surface of the larger diameter sprocket, the chain is caught and lifted by the teeth to the larger diameter sprocket following rotation thereof, and then the springs $S_1$ and $S_2$ act on the supports $G_1$ and $G_2$, for the first time after the chain is lifted, to be switched to the same, whereby the supports $G_1$ and $G_2$ swing to shift the guide pulley $P_1$. Accordingly, in a case where the teeth difference between the numbers of respective sprockets is greater, the chain, even when pushed against the side surface of a larger diameter sprocket, is not caught by the teeth if positioned at the sprocket body. Therefore the chain is neither lifted nor switched to the larger diameter sprocket.

SUMMARY OF THE INVENTION

This invention has been designed in order to solve the above problems in the conventional derailleur. A main object of the invention is to provide a derailleur which uses one tension spring to keep an interval between the respective sprockets of the sprocket assembly constant, without being affected by variation in the spring force of two springs for the respective speed change stages, and which reduces the number of parts resulting in a low manufacturing cost.

Another object of the invention is to provide a derailleur, which can reliably switch the chain even when the difference between the numbers of teeth of adjacent sprockets at the multistage sprocket assembly increases.

The derailleur of the invention is provided at a movable member which may move axially of a multistage sprocket assembly at the bicycle with a guide mechanism constructed as follows: A first support is carried swingably to the movable member through a first pivot shaft, a second support is carried swingably to the first support through a second pivot shaft, a guide pulley is supported rotatably to the free end of the first support, and a tension pulley is supported rotatably to the free end of the second support. A rotary member is provided around the first pivot shaft, a tension spring is interposed between the rotary member and the movable member so as to rotate the rotary member in the direction of applying tension to a driving chain. An interlocking mechanism is interposed between the second support and the rotary member, to apply an elastic force of the spring to the second support. Hence, the one tension spring, acts as the first and second springs $S_1$ and $S_2$ of the conventional example, and simultaneously applies the elastic force acting toward the sprocket assembly axis, to both the guide and tension pulleys, thereby enabling the interval between the guide pulley and each sprocket to be kept always constant.

Furthermore, this invention is provided with a projection, at the guide pulley or the first support of the guide mechanism. The projection utilizes guide pulley rotation due to the driving chain to move the guide pulley away from the axis of the sprocket assembly when the movable member is moved from the smaller diameter sprocket toward the larger diameter one, whereby even when the difference between the numbers of teeth at the smaller diameter sprocket and the larger diameter one is larger, the guide pulley carrying the chain can be positioned corresponding well to the teeth of the larger diameter sprocket, thus ensuring the chain switching.

These and other objects of the invention will become more apparent in the detailed description and examples which follow.

BRIEF DESCRIPTION OF THE INVENTION

Figure 1:
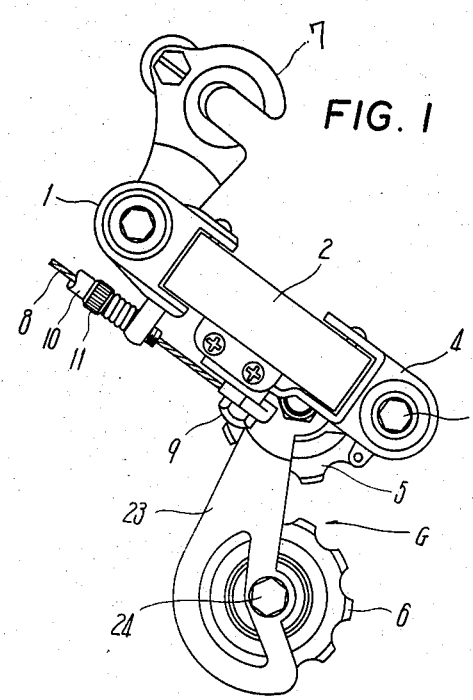
FIG. 1 is a front view of an embodiment of a derailleur for a bicycle of the invention.
Figure 2:
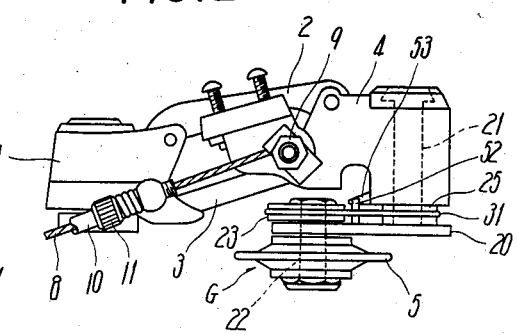
FIG. 2 is a bottom view of the FIG. 1 embodiment.
Figure 4:
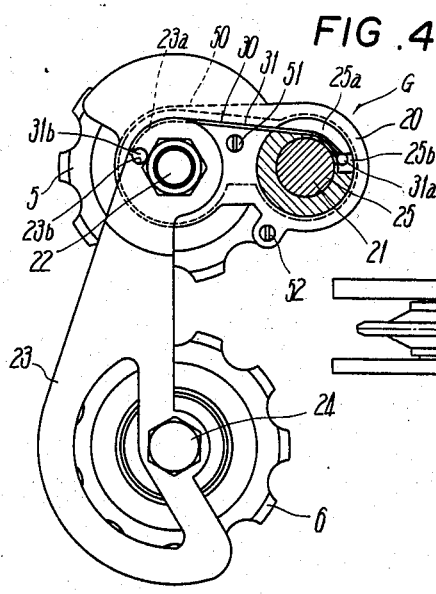
FIG. 4 is a partially cutaway enlarged front view of the principal portion of the same.
Figure 5:
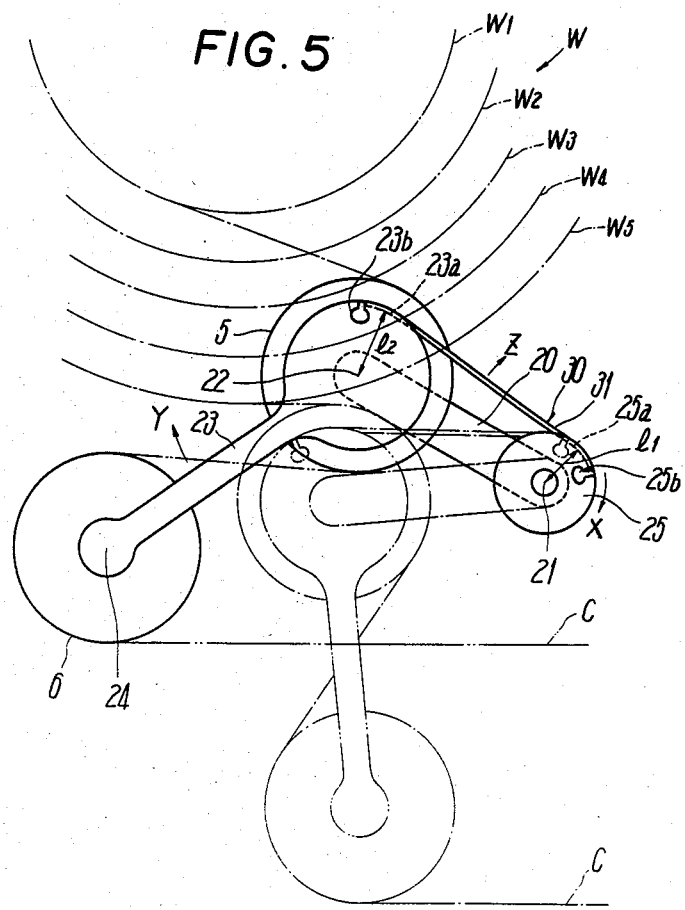
FIG. 5 is a view explaining operation of the derailleur of the invention.
Figure 6:
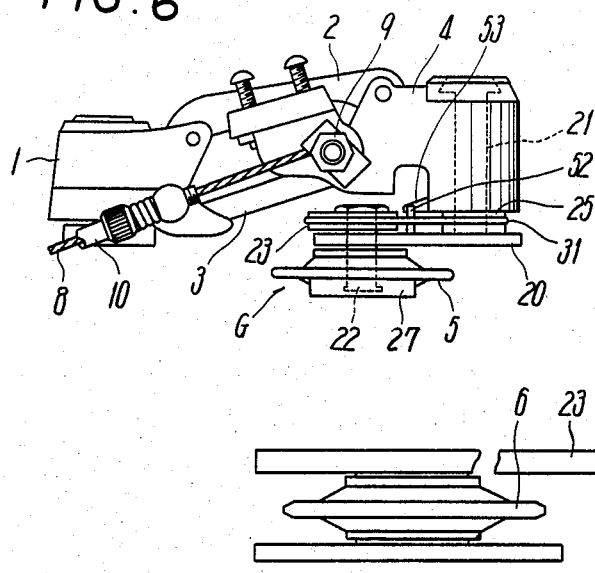
Figure 7:
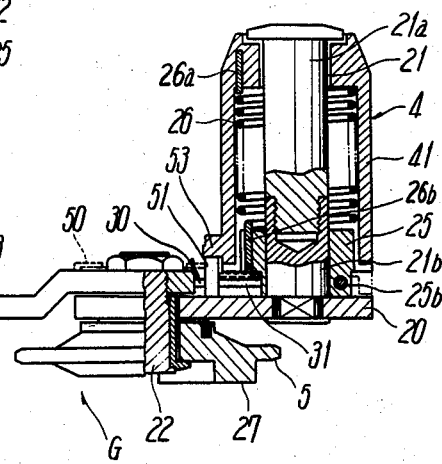

FIG. 6 is a bottom view of a modified embodiment of the invention, corresponding to FIG. 2, FIG. 7 is an enlarged sectional view of the principal portion of the FIG. 6 embodiment, FIG. 8 is a rear view of a guide pulley only, which is used in the embodiment in FIGS. 6 and 7, FIG. 9 is a sectional view of the guide pulley, FIG. 10 is an illustration of a height of a projection shown in the embodiment in FIGS. 6 through 9, FIG. 11 is an illustration of operation of the FIG. 6 embodiment, corresponding to FIG. 5, FIG. 12 is a rear view of a first support provided with the projection, and FIG. 13 is a front view exemplary of the conventional derailleur.

DETAILED DESCRIPTION OF THE INVENTION

The derailleur of the invention fundamentally comprises a base member 1, a movable member 4, and a support means which supports the movable member 4 which is axially movable relative to a multistage sprocket assembly W with respect to the base member 1. The suppot means, shown in the drawings, uses a pair of link members 2 and 3. The movable member 4 is movable along the direction of the axis of the multistage sprocket assembly due to swinging motion of link members 2 and 3 with respect to the base member 1.

The base member 1 is mounted through a bracket 7 to a back fork (not shown) supporting the bicycle rear wheel hub, and the movable member 4 carries a fixture 9 for an operating wire 8. The base member 1 carries a holder 11 for an outer sheath 10 guiding the wire 8, so that the wire 8 is operated and a return spring (not shown) acts to reciprocate the movable member 4 with respect to the base member 1.

The movable member 4 is provided with a guide mechanism G to be discussed below, which comprises a guide pulley 5, for guiding a driving chain to one of sprockets $W_1$ to $W_5$ at the multistage sprocket assembly W, and a tension pulley 6 for applying tension to the chain C.

The guide mechanism G supports a first support 20 swingably relative to the movable member 4 through a first pivot shaft 21, and the first support 20 supports a second support 23 swingably through a second pivot shaft 22. The guide pulley 5 is supported rotatably at the free end of first support 20 and around the second pivot shaft 22, and the tension pulley 6 at the free end of second support 23 rotatably through a support spindle 24.

A rotary member 25 is provided rotatably around the first pivot shaft 21. One tension spring 26 for rotating the rotary member 25 in the direction of applying tension to the chain is interposed between the rotary member 25 and the movable member 4. An interlocking mechanism 30, interposed between the second support 23 and the rotary member 25, applies the spring force of the tension spring 26 to the second support 23 in a predetermined ratio.

Figure 3:
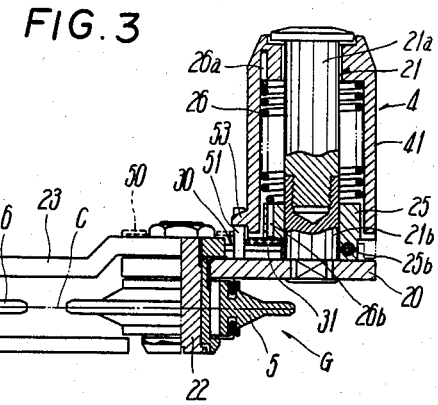
FIG. 3 is an enlarged sectional view of the principal portion of the same.

The movable member 4, as shown in FIG. 3, is provided with a cylindrical member 41 into which the first pivot shaft 21 is housed rotatably so that the firt support 20 is fixed thereto. The tension spring 26 comprises a coiled spring which is housed together with the rotary member 25 in the cylindrical member 41. The tension spring 26 is retained at one end 26a to the end wall of cylindrical member 41 and at the other end to the rotary member 25.

In addition, the first pivot shaft 21 comprises a pair of divided shafts 21a and 21b, one divided shaft 21a being provided with a head which has a rotary control and engages with the end wall of cylindrical member 41. The other divided shaft 21b is fixed to the first support 20 by a calking or the like, so that the shafts 21a and 21b are screwed together by rotating the shaft 21a.

The rotary member 25 is cylindrical and sleeved rotatably onto the divided shaft 21b and provided at one axial end with a wire guide groove 25a, into which a wire 31 of the interlocking mechanism 30 is wound, and with a retaining groove 25b for retaining one end of the wire 31.

The second support 23 at the root thereof pivoted to the second pivot shaft 22 is provided with a wire guide groove 23a for the wire 31 and with a wire retaining groove 23b for retaining the other end of wire 31.

The interlocking mechanism 30 uses, for example, the wire 31 as shown. Both ends of the wire 31 have retaining portions 31a and 31b retained to the retaining grooves 25b and 23b at the rotary member 25 and second support 23. Referring to FIG. 5, a length $l_1$ is shown between the axis of rotation of rotary member 25 and the position of wire 31 retained thereto, and a length $l_2$ is shown between the axis of rotation of second support 23 and the position of wire 31 retained to the second support 23. A predetermined ratio defines the length 1, and $l_2$, so that the elastic force F of tension spring 26 is allowed to act on the second support 23 at the predetermined ratio.

In addition, in the drawings, numeral 50 designates a cover, and numerals 51 and 52 designate stopper pins erect from the first support 20. Numeral 53 designates a stopper for the stopper pins 51 and 52, which restricts a range of swinging motion of first support 20.

In the above construction, the rotary member 25 is subjected to the elastic force F of tension spring 26 and rotates in the direction of the arrow X in FIG. 5. The second support 23 is subjected to the elastic force F under the predetermined ratio through the wire 31 and swings around the second pivot shaft 22 under the moment $Fl_2$ in the direction of the arrow Y in FIG. 5. In addition, the first support 20 also is subjected to the elastic force F through the chain C carried on the guide pulley 5 and swings around the first pivot shaft 21 under the moment f in the direction of the arrow Z.

The moment $Fl_2$ of the second support 23 depends on the elastic force F and length $l_2$, while the moment f of the first support 20 depends on F, therefore $Fl_2$ and f are balanced with a preset ratio of $l_1$ to $l_2$.

When the length $l_2$ is made smaller than that $l_1$, the moment $Fl_2$ becomes smaller than moment f, so the guide pulley 5 is too close to the sprocket. When $l_2$ is made too much larger than $l_1$, $Fl_2$ becomes too much larger with respect to f so the same moves away too much from the sprocket. Therefore, the preferrable ratio of $l_1$ to $l_2$ sets $Fl_2$ equal to 0.5 to 1.5 times as large as f.

Next, explanation will be given on operation of the derailleur of the invention in accordance to FIG. 5. In FIG. 5, the solid line shows the state where the chain C is carried on the smallest diameter procket $W_1$ of the sprocket asembly W and the dot-and-dash line shows the state where the chain C is carried on the largest diameter sprocket $W_5$.

In these states, the chain C is subjected to the moments $Fl_2$ and f and tensioned under the elastic force F from the tension spring 26.

In a case where the chain C is carried on the smallest diameter sprocket $W_1$, then the chain tension is minimized. Thus, the second support 23, with the tension pulley 6, swings largely clockwise (in the Y direction) under the moment $Fl_2$ resulting from the elastic force F and thereby absorbs the slack of chain C. Also, the first support 20 is subjected to the moment f following F through the chain C so as to swing clockwise (in the Z direction), thereby moving the guide pulley 5 close to the sprocket $W_1$.

On the contrary, in a case where the chain C is switched from the smallest diameter sprocket $W_1$ to the largest diameter one $W_5$, the chain tension is maximized. Thus, the second support 23, as shown by the dot-and-dash line in FIG. 5, swings counterclockwise and the chain tension overcomes the moment f, following the elastic force F, to swing the first support 20 counterclockwise and allow the guide pulley 5 to be positioned corresponding to the sprocket $W_5$.

As seen from the above, the derailleur of the invention uses one tension spring 26 to apply its elastic force F to the tension pulley 6 and guide pulley 5 through the second support 23 and first support 20 respectively. Moreover, the second support 23 is subjected to the elastic force F, as the moment $Fl_2$ corresponding to the length $l_2$, and the first support 20 is subjected to the moment f following the elastic force F. Hence, when the chain C is switched from one of sprockets $W_1$ to $W_2$ to another, the guide pulley 5 is forced to shift under the relation between the moments $Fl_2$ and f following variation of chain tension, thereby enabling an interval between the guide pulley 5 and the respective sprockets $W_1$ to $W_5$ to be kept constant at each speed change stage. A balance between the moments $Fl_2$ and f can be set by the ratio of $l_1$ to $l_2$, and thereby remains constant regardless of variation in the chain tension. Also, the balance may be set readily, exactly and with high dimensional accuracy during manufacturing by use of the ratio of $l_1:l_2$, and thus avoiding the variations created by forces of two springs in conventional manufacturing. Thus the aforesaid balance can be set accurately without getting out of order from variation in the elastic force of the spring in use.

Alternatively, the guide pulley 5 may be supported to the first support 20 through another pivot shaft shifted from the second pivot shaft 22.

Also, the second support 23, which is overlapped with the first support 20, may alternatively be supported to the second pivot shaft 22 at the outside of guide pulley 5 with respect to the movable member 4.

In this case, the second support 23 may comprise a pair of plates which sandwich therebetween the first support 20 and guide pulley 5, and may be supported at both axial ends of second pivot shaft 22.

Also, the interlocking mechanism may alternatively use gears.

In this case, a first gear is provided at the rotary member 25, a second gear at the second support 23, and at least one intermediate gear at the first support 20, thereby allowing these gears to engage with each other. In brief, the interlocking mechanism 30 need only be constructed to apply, to the second support 23, the elastic force of spring 26 in the constant ratio, which is not particularly defined.

The derailleur of the invention constructed as foregoing, may be provided at the guide mechanism G with a projection 27 by which the guide pulley 5 is moved away from the axis of sprocket assembly W when rotated by the driving chain.

Next, explanation will be given of a modified embodiment of the invention which uses the projection 27 to forcibly move the guide pulley 5. The derailleur shown in FIGS. 6 and 7, is provided with the projection 27 formed at the side surface of guide pulley 5 at the sprocket side as shown in FIGS. 8 and 9.

In this case, the second pivot shaft 22 supporting the guide pulley 5, is positioned at one axial end inwardly from the projecting end of projection 27 as shown in FIG. 7. When the chain is switched to the larger diameter sprocket, the movable member 4 moves to bring the side surface of guide pulley 5 body at the sprocket side into contact with the sprocket, whereby the projection 27 is adapted to contact with the tips of teeth of the larger diameter sprocket by means of rotation of guide pulley 5 caused by movement of chain C.

The projection 27 is made partially annular as shown in FIG. 8 and slanted or formed in circular arc, at both ends to form the guide surfaces and is 2.5 to 4.4 mm, preferably 3.5 mm, high with respect to the side surface of the guide pulley body.

In other words, when the guide pulley 5, as shown in FIG. 10, is urged to a maximum toward a larger diameter sprocket $W_4$ to bring the chain carried on the guide pulley 5 into contact with the sprocket $W_4$, the utmost end of projection 27 reaches the tips of teeth of sprocket $W_4$ and should not contact the adjacent larger diameter sprocket $W_5$. Therefore, the height H of projection 27 is made larger than a distance $l_3$ (normally 2.5 mm) between the end face of projecting roller pin and the inner surface of an inner link plate at the chain C, and smaller than a length (usually 0.2 mm) : the sum of an interval d (normally 4.2 mm) between the respective sprockets and the remainder $d_1$ (normally 0.2 mm) in a subtraction of a thickness of a tooth at the guide pulley 5 from an interval between the the inner surfaces of inner link plates.

Next, explanation will be given on the operation of the embodiment shown in FIGS. 6 and 7 in accordance with FIG. 11, in which the solid line shows the state where the chain C is carried on the smaller diameter sprocket $W_2$ at the sprocket assembly and the dot-and-dash line, the state where the same is carried on the largest diameter sprocket $W_5$. In addition, in this embodiment, a difference between the numbers of teeth of the larger diameter sprocket $W_4$ and the largest diameter one $W_5$ is assumed to be 10 or more.

When the chain C switches from the sprocket $W_2$ as shown by the solid line in FIG. 11 to the sprocket $W_5$, the guide pulley 5 guides the chain C to contact the side surface of sprocket $W_5$ where it remains unlifted. However, since the chain C travels to rotate the guide pulley 5, the projection 27 comes in contact with the tooth tip of sprocket $W_5$, and forcibly shifts the guide pulley 5 in the direction opposite to arrow Z.

As a result, the chain C comes in contact with the toothed portion of the largest diameter sprocket $W_5$, thereby being caught by the teeth thereof and lifted so that the chain C is tensioned to a maximum. Thus, the second support 23 swings counterclockwise as shown by the dot-and-dash line in FIG. 11, and the first support 20 further swings counterclockwise because the chain tension overcomes the movement f derived from the elastic force F of spring 26. Thus, it is ensured that the guide pulley 5 is positioned corresponding to the larget diameter sprocket $W_5$ and the chain C is switched thereto.

Accordingly, even when the difference between the numbers of teeth of the respective adjacent sprockets $W_1$ to $W_5$ increases, the projection 27 forces the guide pulley 5 to move away from the axis of sprocket assembly W. Thus, there is no fear of causing an improper speed change by the greater difference between the numbers of teeth.

Alternatively, the projection 27 may be provided at the first support 20 as shown in FIG. 12.

In this case, the projection 27 is positioned inwardly from the path of movement of chain C guided by the guide pulley 5. The projection 27 is brought into contact with the chain C by utilizing movement of chain C toward the first support 20 when switched to the larger diameter sprocket, thereby forcing the first support 20 to shift counterclockwise the same as in the FIG. 11 embodiment.

In addition, the height of projection 27 is set, in this embodiment, such that the chain C does not normally contact the projection 27, but contacts one side of the projection 27 during the switching, thereby moving the first support 20. The height of projection 27 is usually 0.5 to 1 mm, preferably 0.8 mm.

As seen from the above, the derailleur of the invention uses one tension spring to apply the elastic force to the tension and guide pulleys respectively. The tension pulley is subjected to the elastic force in the predetermined ratio through the second support and interlocking mechanism. The elastic forces on the pulleys are balanced to each other by the ratio set by the interlocking mechanism, and the interval between the guide pulley and each sprocket, is held constant to thereby ensure smooth switching of the chain.

Furthermore, since the elastic force is mechanically balanced by the interlocking mechanism by means of ratio of length or gear ratio, and the balance of elastic force avoids inaccuracies inherent to the conventional example using two springs, and the balance is always kept accurate even if the elastic force of the spring changes.

Furthermore, the use of only one tension spring saves on the number of parts and simplifies assembly to lower the manufacturing cost.

Moreover, the projection provided at the guide mechanism moves the guide pulley away from the axis of sprocket assembly when the chain is shifted from the smaller diameter sprocket to the larger diameter one. Therefore, even when the difference between the numbers of teeth of adjacent sprockets increases, the chain movement or guide pulley rotation is utilized to forcibly move the guide pulley, thereby always ensuring the chain switching to the larger diameter sprocket.

Although the invention has been described with reference to several different embodiments, these embodiments are merely exemplary and do not limit the invention which is defined solely by the appended claims.

What is claimed is:

1. A derailleur for a bicycle comprising a base member, a movable member, and a support means for supporting said movable member so that it is movable axially relative to a multistage sprocket assembly for the bicycle with respect to said base member; said movable member including a guide mechanism which guides a driving chain to one sprocket at said multistage sprocket assembly, said guide mechanism comprising a first support member supported swingably to said movable member through a first pivot shaft and having a free end, a second support member supported swingably to the free end of said first support member through a second pivot shaft and having a free end, a guide pulley mounted rotatably to the free end of said first support member, and a tension pulley mounted rotatably to the free end of said second support member; said guide mechanism further comprising a rotary member mounted rotatably around said first pivot shaft, a tension spring interposed, between said rotary member and said movable member, for rotating said rotary member in the direction of imparting tension to said chain; and an interlocking mechanism interposed between said rotary member and said second support member for allowing an elastic force of said spring to act on said second support member in a predetermined ratio.

2. A derailleur for a bicycle according to claim 1, wherein said guide pulley is supported rotatably around said second pivot shaft.

3. A derailleur for a bicycle according to claim 1, wherein wire guide grooves are provided at the outer periphery of said rotary member and at the outer periphery of the root of said second support member pivoted to said second shaft respectively, said interlocking mechanism comprising a wire having at both ends thereof retaining portions, each of said wire guide grooves at said rotary member and second support member having a retaining groove for receiving therein each of said retaining portions at said wire, so that said retaining portions at said wire engage with said retaining grooves to interlock said rotary member with said second support member.

4. A derailleur for a bicycle according to claim 1, wherein said guide mechanism is provided with a projection which moves said guide pulley away from the axis of said multistage sprocket assembly by use of said chain driven when said movable member is moved from a smaller diameter sprocket to the larger diameter one at said multistage sprocket assembly.

5. A derailleur for a bicycle according to claim 4, wherein said projection is disposed at the side surface of said guide pulley opposite to said larger diameter sprocket, so that when said movable member moves toward said larger diameter sprocket, said projection interferes therewith and said chain is driven to rotate said guide pulley, whereby said guide pulley moves away from the axis of said procket assembly.

6. A derailleur for a bicycle according to claim 4, wherein said projection is disposed on the side surface at the free end of said first support member opposite to said guide pulley, so that when said movable member moves toward said larger diameter sprocket, said projection interferes with said chain and said chain is driven to swing said first support member, whereby said guide pulley moves away from the axis of said sprocket assembly.

* * * * *